United States Patent [19]
Nakajima

[11] Patent Number: 5,696,633
[45] Date of Patent: Dec. 9, 1997

[54] VARIFOCAL LENS

[75] Inventor: Masaya Nakajima, Yokohama, Japan

[73] Assignee: Nikon Corporation, Tokyo, Japan

[21] Appl. No.: 608,430

[22] Filed: Feb. 28, 1996

[30] Foreign Application Priority Data

Mar. 2, 1995 [JP] Japan ................................. 7-068627

[51] Int. Cl.⁶ ................................................ G02B 15/14
[52] U.S. Cl. ................................. 359/691; 359/689
[58] Field of Search ............................. 359/691, 689

[56] References Cited

U.S. PATENT DOCUMENTS

| | | | |
|---|---|---|---|
| 4,934,794 | 6/1990 | Ueda | 359/689 |
| 4,938,572 | 7/1990 | Iwasaki | 359/689 |
| 5,073,015 | 12/1991 | Ueda | 359/689 |

FOREIGN PATENT DOCUMENTS

| | | |
|---|---|---|
| SHO 61-59306 | 3/1986 | Japan. |
| SHO 61-129613 | 6/1986 | Japan. |
| 3-196110 | 8/1991 | Japan. |

*Primary Examiner*—Scott J. Sugarman
*Attorney, Agent, or Firm*—Klarquist Sparkman Campbell Leigh & Whinston, LLP

[57] ABSTRACT

A varifocal lens is disclosed that includes, in order front to rear, a first lens group having an overall negative focal length and a second lens group having an overall positive focal length. The first and second lens groups are axially separated by a space that changes as the focal length of the varifocal lens is changed. The first lens group comprises, in order from front to rear, a biconcave lens element and a positive lens element. The second lens group comprises, in order from front to rear, a front subgroup and a rear subgroup. The front subgroup comprises, in order from front to rear, a first positive lens element, a first cemented lens, a second cemented lens having positive refractive power, and a second positive lens element. The rear subgroup comprises, in order from front to rear, a negative lens element, a positive lens element, and a negative meniscus lens element having a convex face oriented rearwardly. The varifocal lens fulfills the conditions:

$$0.8 < |fb/fa| < 1.7$$

$$0.5 < |D/f2| < 1.2$$

$$1.4 < f1/fb < 2.5$$

wherein, f1 is the focal length of the first lens group, f2 is the focal length of the second lens group, fa is the focal length of the front subgroup, fb is the focal length of the rear subgroup, and D is the distance between the rear principal point of the front subgroup and the front principal point of the rear subgroup. The varifocal lens is especially suitable for use in photographic enlargers.

19 Claims, 12 Drawing Sheets

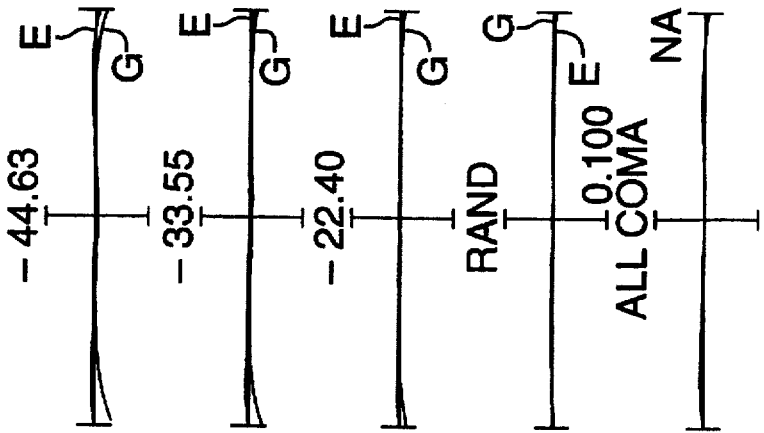
FIG. 2D TRANSVERSE ABERRATION
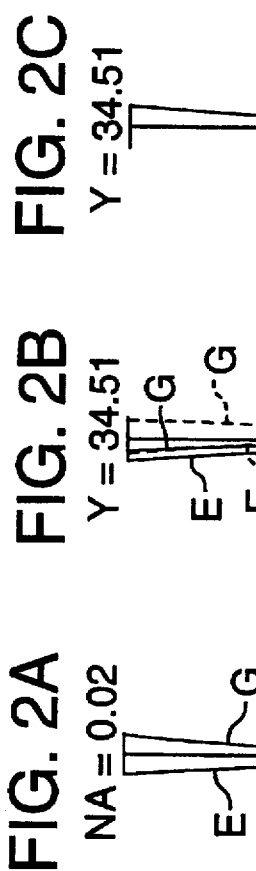
FIG. 2A NA = 0.02 SPHERICAL ABERRATION
FIG. 2B Y = 34.51 ASTIGMATISM
FIG. 2C Y = 34.51 DISTORTION
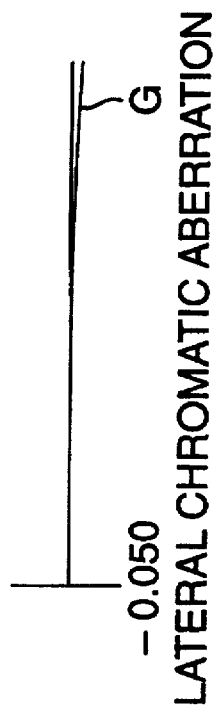
FIG. 2E LATERAL CHROMATIC ABERRATION

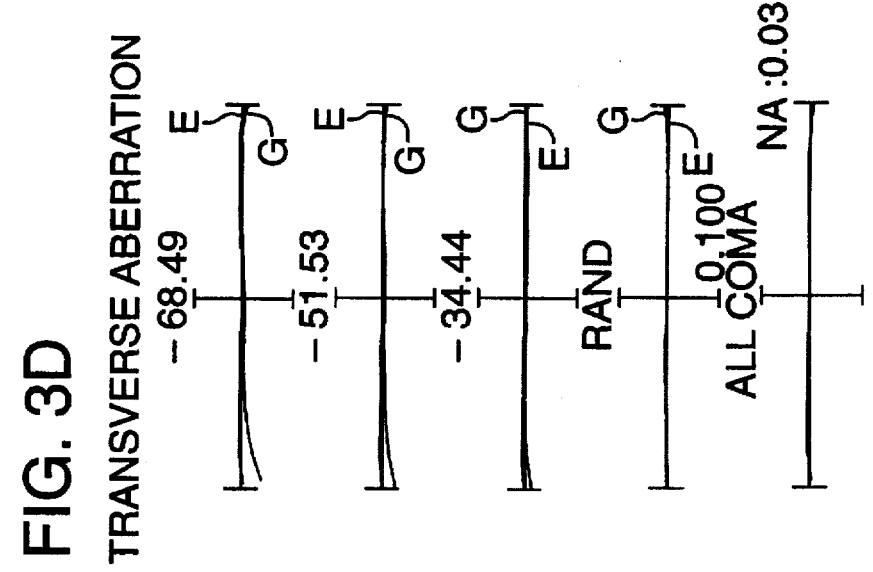
FIG. 3A NA = 0.03 SPHERICAL ABERRATION
FIG. 3B Y = 34.51 ASTIGMATISM
FIG. 3C Y = 34.51 DISTORTION
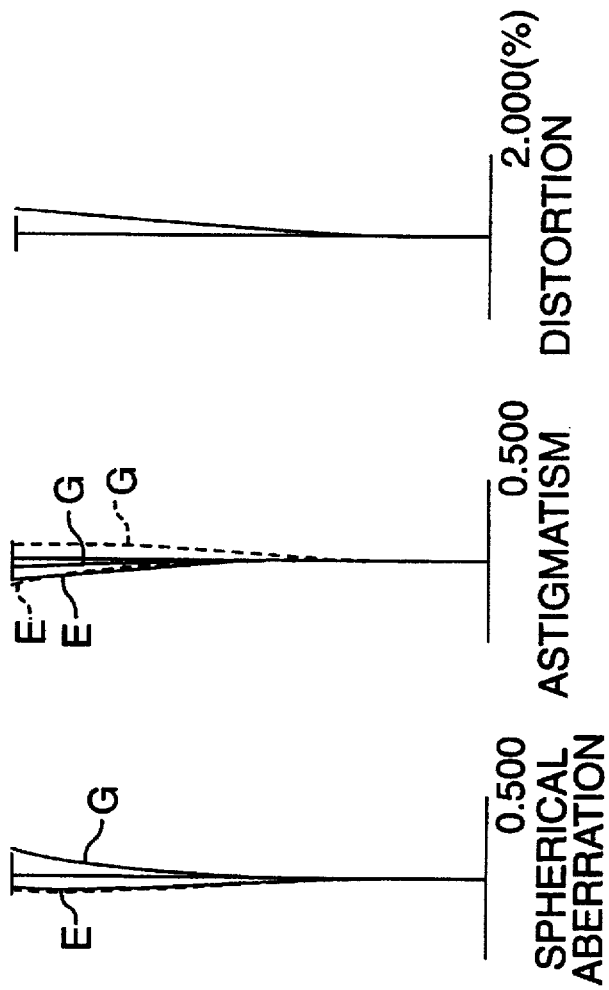
FIG. 3D TRANSVERSE ABERRATION
FIG. 3E LATERAL CHROMATIC ABERRATION

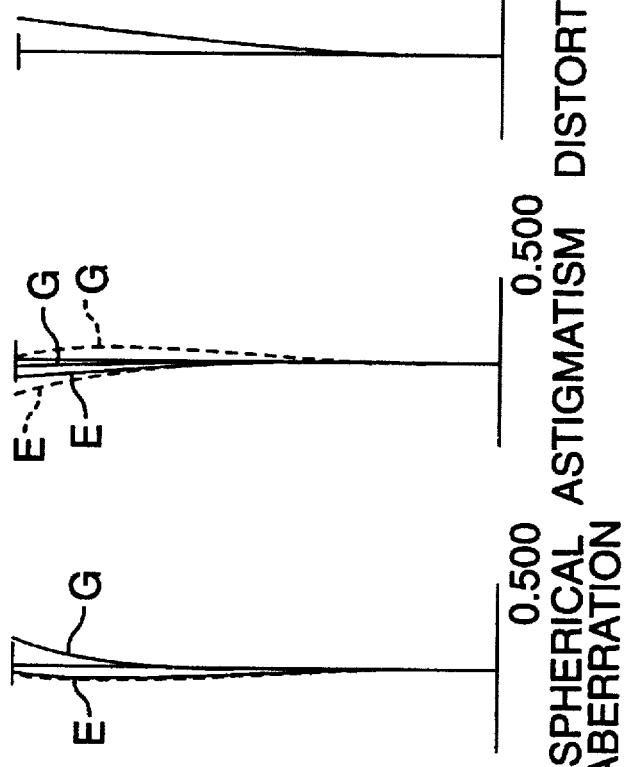

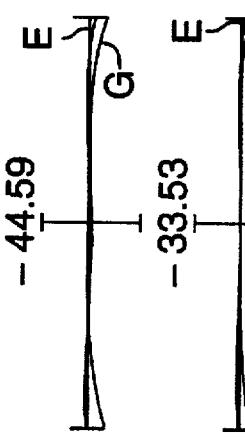

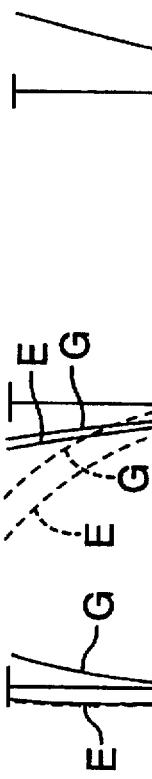

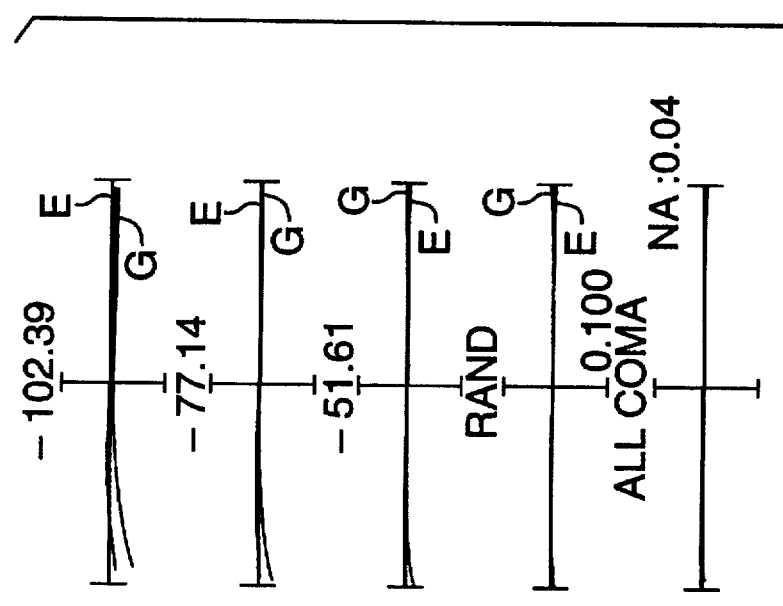
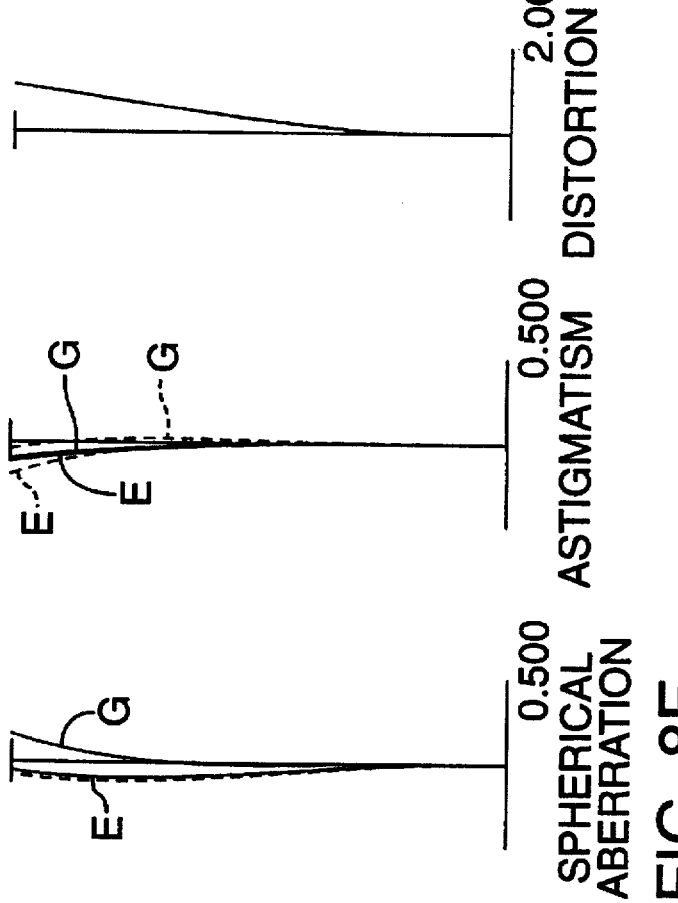
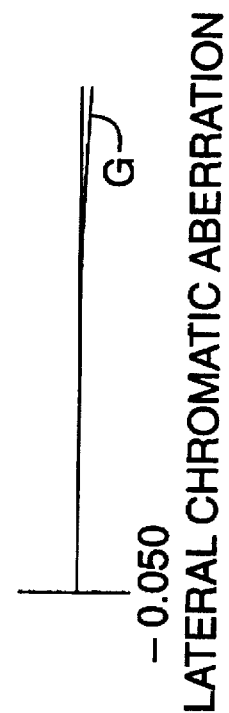

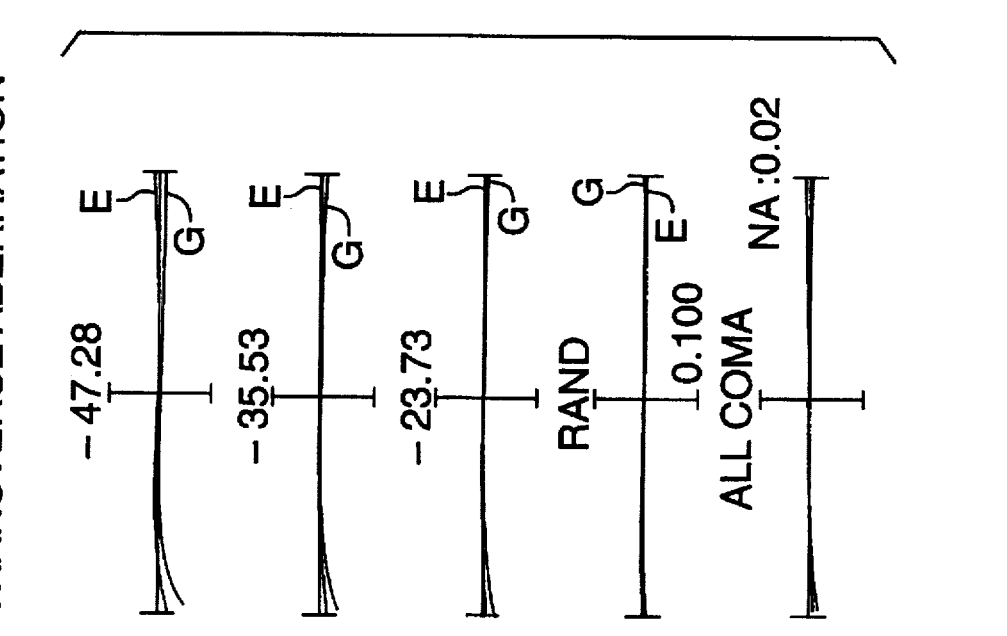
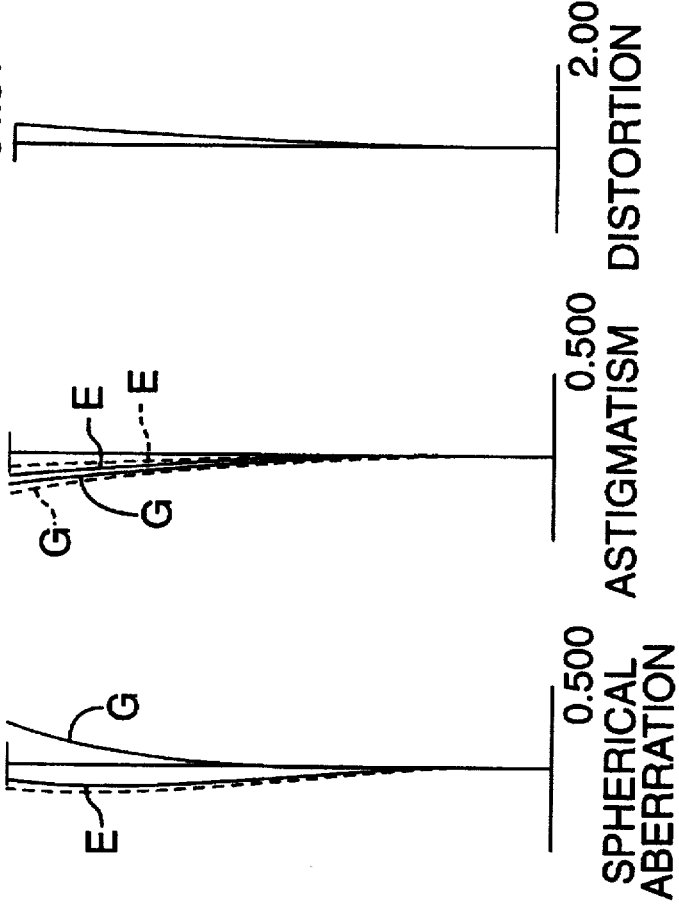

FIG. 11A NA = 0.03
SPHERICAL ABERRATION

FIG. 11B Y = 34.51
ASTIGMATISM

FIG. 11C Y = 34.51
DISTORTION

TRANSVERSE ABERRATION

LATERAL CHROMATIC ABERRATION

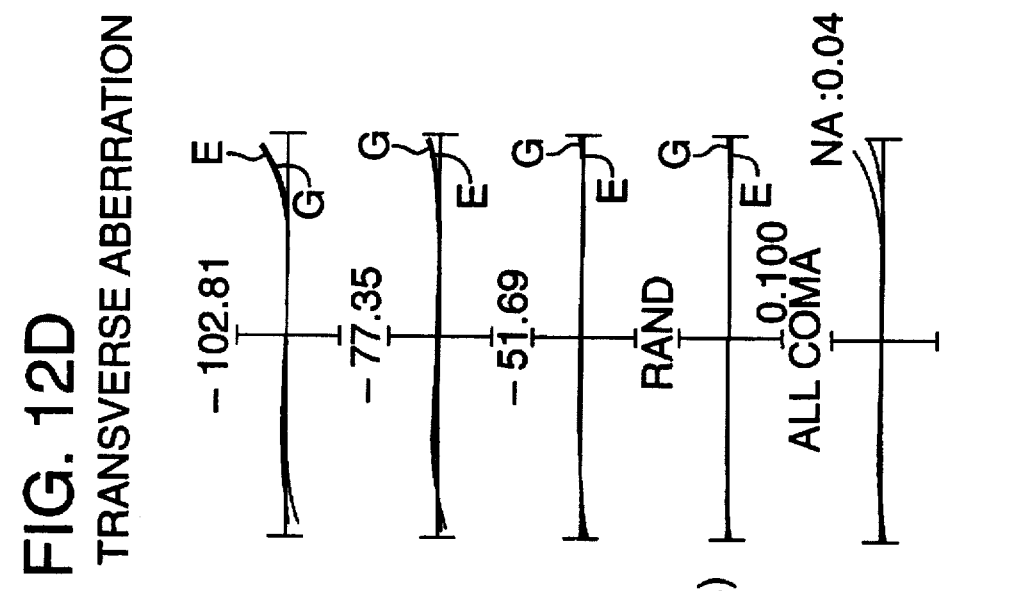
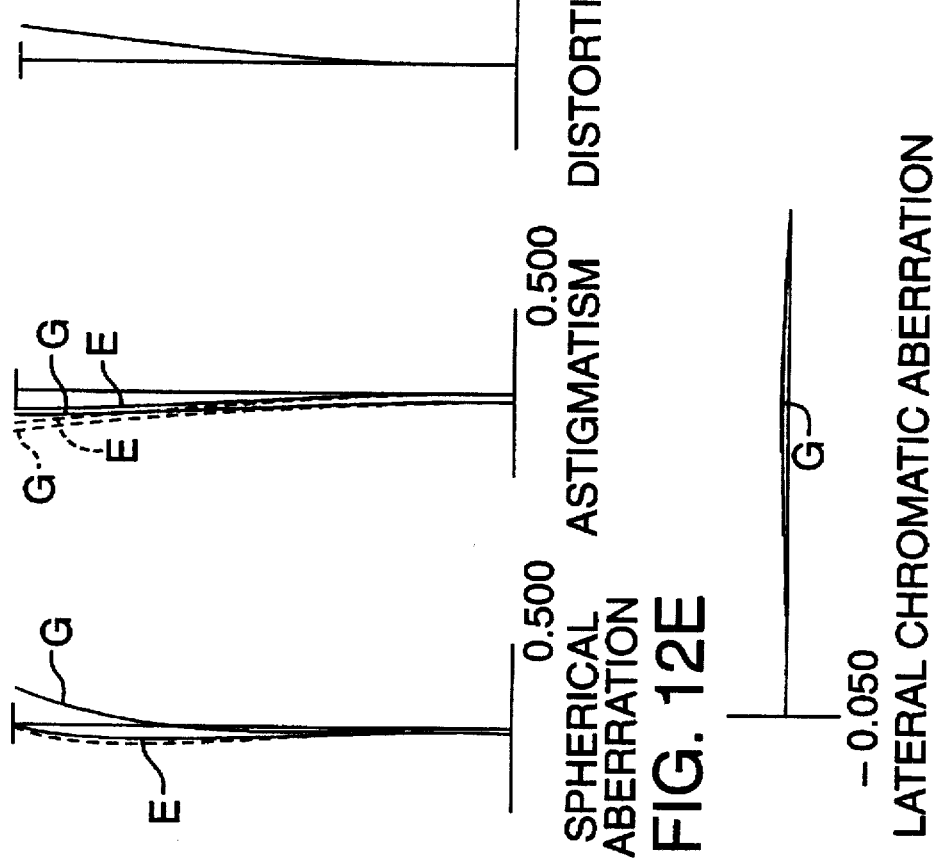
FIG. 12A SPHERICAL ABERRATION NA = 0.04
FIG. 12B ASTIGMATISM Y = 34.51
FIG. 12C DISTORTION Y = 34.51
FIG. 12D TRANSVERSE ABERRATION
FIG. 12E LATERAL CHROMATIC ABERRATION

1

VARIFOCAL LENS

FIELD OF THE INVENTION

This invention pertains to a varifocal lens, i.e., a lens in which the magnification can be continuously changed over a range of focal lengths. This invention particularly pertains to a varifocal lens usable at finite ranges, as in a photographic enlarger.

BACKGROUND OF THE INVENTION

In many conventional photographic enlargers, the enlarging magnification is changed by changing the various positional relationships between the enlarger lens having a fixed focal length, the film, and the photographic paper.

On the other hand, in commercial photographic enlargers used in high-throughput applications, the positions of the film and photographic paper are fixed and the enlarging magnification is often changed using a variable-focus ("varifocal") enlarger lens. Varifocal enlarger lenses typically comprise two lens groups. The simplest and least expensive way of changing the focal length of the enlarger lens is by changing the space between the two lens groups.

With a photographic enlarger, it is necessary to maintain a certain distance between the film and the lens in order to accommodate, for example, an exposure control mechanism and shutter with the lens. It is also desirable for the distance between the enlarger lens and the photographic paper to be as great as possible in order to improve the operability of the enlarger.

However, in conventional varifocal enlarger lenses that are configured with two lens groups comprising, in order from the photographic paper side, a negative lens group and a positive lens group, the distance between the photographic paper and the enlarger lens becomes unacceptably small when the lens is used at low magnification.

Conversely, in conventional varifocal enlarger lenses that are configured with two lens groups comprising, in order from the photographic paper side, a positive lens group and a negative lens group, there is a tendency for the distance between the enlarger lens and the film to become unacceptably small when the lens is used at high magnification.

Thus, it has been difficult, with conventional varifocal lenses employing this simple two-group configuration, to realize practical photographic enlargers that have superior operability over a desired range of image magnification while also providing excellent image quality.

SUMMARY OF THE INVENTION

An object of the present invention is to provide a varifocal lens that, while having a simple two-lens-group configuration, provides excellent image quality while maintaining a sufficient distance between the lens and the film and between the lens and the photographic paper when the lens is used, e.g., in a photographic enlarger, over a desired range from low magnification to high magnification.

According to a preferred embodiment of the present invention, a varifocal lens is provided that includes, in order from frontwise (closest to the photographic printing paper) to rearwise (closest to the photographic film containing the image to be printed) on an optical axis, a first lens group having an overall negative focal length, and a second lens group having an overall positive focal length. The first and second lens groups are separated from each other by an axial distance that changes as the focal length of the lens is changed. The first lens group comprises, frontwise to rearwise, a biconcave lens and a positive lens. The second lens group comprises a front lens subgroup and a rear lens subgroup. The front subgroup comprises, frontwise to rearwise, a first positive lens element, a cemented lens assembly, a doublet having a positive refractive power, and a second positive lens element. The rear subgroup comprises, frontwise to rearwise, a first negative lens element, a positive lens element, and a second negative lens element configured as a meniscus lens with its convex face facing rearward.

A varifocal lens according to the present invention preferably fulfills the following conditions:

$$0.8 < |fb/fa| < 1.7$$

$$0.5 < |D/f2| < 1.2$$

$$1.4 < f1/fb < 2.5$$

wherein:

f1 is the focal length of the first lens group,
f2 is the focal length of the second lens group,
fa is the focal length of the front subgroup of the second lens group,
fb is the focal length of the rear subgroup of the second lens group, and
D is the axial distance between the rear principal point of the front subgroup and the front principal point of the rear subgroup.

Additional purposes, characteristics and benefits of this invention shall become clear in the following description, referring to the attached figures.

BRIEF DESCRIPTION OF THE DRAWINGS

FIG. 2 includes various aberration diagrams of the FIG.-1 embodiment at a low-magnification setting. Specifically, FIG. 2A shows spherical aberration, FIG. 2B shows astigmatism, FIG. 2C shows distortion, FIG. 2D shows transverse aberration, and FIG. 2E shows lateral chromatic aberration.

FIG. 3 includes various aberration diagrams of the FIG.-1 embodiment at a medium-magnification setting. Specifically, FIG. 3A shows spherical aberration, FIG. 3B shows astigmatism, FIG. 3C shows distortion, FIG. 3D shows transverse aberration, and FIG. 3E shows lateral chromatic aberration.

FIG. 4 includes various aberrations diagrams of the FIG.-1 embodiment at a high-magnification setting. Specifically, FIG. 4A shows spherical aberration, FIG. 4B shows astigmatism, FIG. 4C shows distortion, FIG. 4D shows transverse aberration, and FIG. 4E shows lateral chromatic aberration.

FIG. 6 includes various aberration diagrams of the FIG.-5 embodiment at a low-magnification setting. Specifically, FIG. 6A shows spherical aberration, FIG. 6B shows astigmatism, FIG. 6C shows distortion, FIG. 6D shows transverse aberration, and FIG. 6E shows lateral chromatic aberration.

FIG. 7 includes various aberration diagrams of the FIG.-5 embodiment at a medium-magnification setting. Specifically, FIG. 7A shows spherical aberration, FIG. 7B shows astigmatism, FIG. 7C shows distortion, FIG. 7D shows transverse aberration, and FIG. 7E shows lateral chromatic aberration.

FIG. 8 includes various aberrations diagrams of the FIG.-5 embodiment at a high-magnification setting. Specifically, FIG. 8A shows spherical aberration, FIG. 8B shows astigmatism, FIG. 8C shows distortion, FIG. 8D shows transverse aberration, and FIG. 8E shows lateral chromatic aberration.

FIG. 10 includes various aberration diagrams of the FIG.-9 embodiment at a low-magnification setting. Specifically, FIG. 10A shows spherical aberration, FIG. 10B shows astigmatism, FIG. 10C shows distortion, FIG. 10D shows transverse aberration, and FIG. 10E shows lateral chromatic aberration.

FIG. 11 includes various aberration diagrams of the FIG.-9 embodiment at a medium-magnification setting. Specifically, FIG. 11A shows spherical aberration, FIG. 11B shows astigmatism, FIG. 11C shows distortion.

FIG. 12 includes various aberrations diagrams of the FIG.-9 embodiment at a high-magnification setting. Specifically, FIG. 12A shows spherical aberration, FIG. 12B shows astigmatism, FIG. 12C shows distortion, FIG. 12D shows transverse aberration, and FIG. 12E shows lateral chromatic aberration.

DETAILED DESCRIPTION OF PREFERRED EMBODIMENTS

A "positive" distance or direction along an optical axis extends from left to right in an optical diagram; a "negative" distance or direction extends from right to left.

The "curvature radius" of an optical surface (such as a surface of a lens element) is "positive" whenever the center of curvature lies to the right of the surface, and "negative" whenever the center of curvature lies to the left of the surface.

An "interfacial distance" is the distance, along an optical axis, between adjacent optical surfaces on separate optical elements.

A "principal point" is a point of intersection of the optical axis and a principal plane. The principal plane location is determined by first tracing paraxial rays through a lens element (or collection of lens elements) from the front (or rear) focal point, and then linearly extending the rays forward and backward from the first lens surface and the last lens surface, respectively, and noting where the rays intersect.

Figure 1:
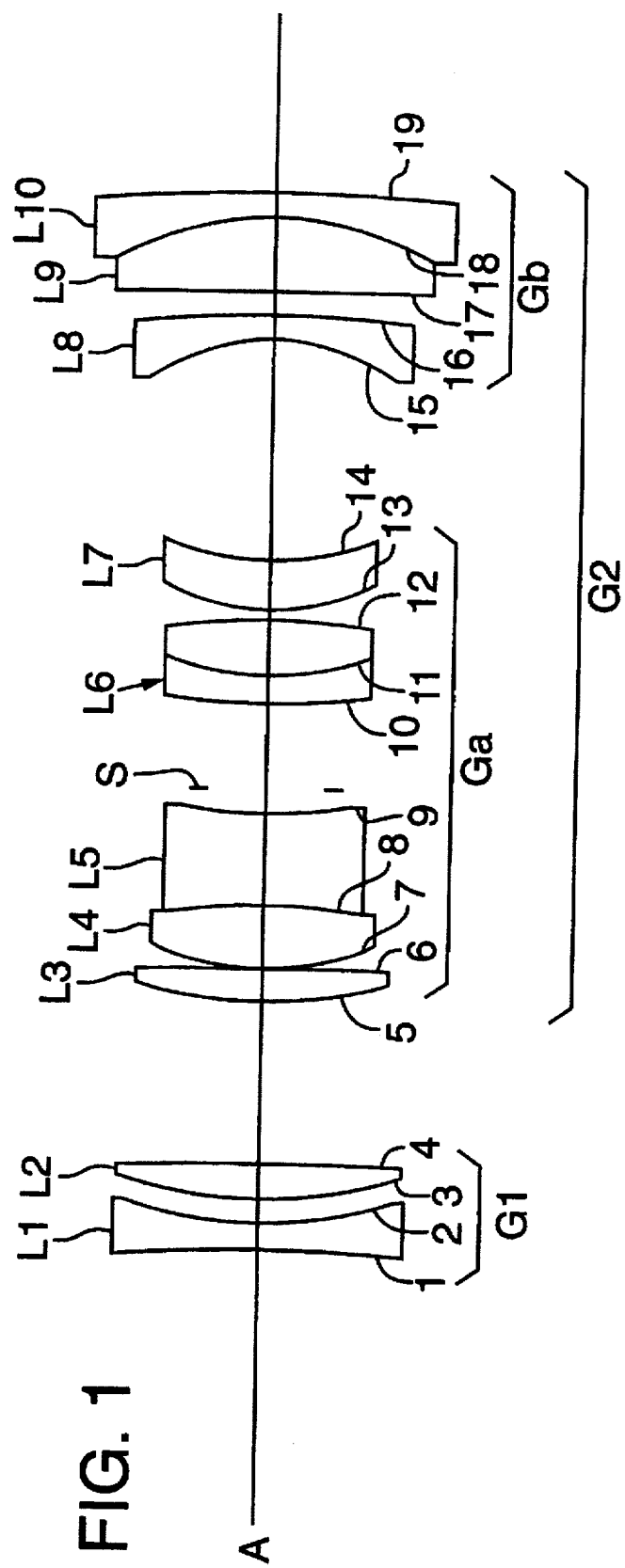
FIG. 1 is an optical diagram showing general aspects of a varifocal lens according to the present invention as well as specific aspects of the first Example Embodiment.

General aspects of a varifocal lens according to the present invention can be seen, for example, in FIG. 1. Beginning frontwise and proceeding rearwise, the lens comprises a first lens group G1 having an overall negative focal length and a second lens group G2 having an overall positive focal length. The first lens group G1 comprises, in order from frontwise to rearwise, a biconcave lens element L1 and a positive lens element L2. The second lens group G2 comprises, in order from frontwise to rearwise, a front lens subgroup Ga having an overall positive focal length and a rear lens subgroup Gb having an overall negative focal length. The front subgroup Ga comprises, in order from frontwise to rearwise, a first positive lens element L3; a second positive lens element L4 cemented to a first negative (preferably biconcave) lens element L5; a cemented doublet L6 having a positive refractive power; and a third positive (preferably meniscus) lens element L7. The rear subgroup Gb comprises, in order from frontwise to rearwise, a first negative (preferably meniscus) lens element LB, a positive lens element L9, and a second negative lens element L10 preferably configured as a meniscus lens element having a concave surface oriented frontwardly. The second negative lens element L10 can be either cemented to the positive lens element L9 or axially separated from the positive lens element L9. An aperture S, preferably adjustable, is disposed between the lens element L5 and the doublet L6.

Whenever the overall focal length setting of the varifocal lens is changed, the axial space situated between the first lens group G1 and the second lens group G2 changes.

Thus, in a varifocal lens according to the present invention, the second lens group G2 comprises a telephoto-type lens with a small telephoto ratio (i.e., the ratio of the overall lens length to the overall lens focal length). Such an embodiment, particularly whenever employed in a photographic enlarger, provides excellent image quality on photographic paper and the like while allowing a sufficient distance between the lens and the photographic film, and between the lens system and the photographic paper, even when the lens is set to provide either a low magnification or a high magnification.

A varifocal lens system according to the present invention, especially for use in a photographic enlarger, preferably fulfills Conditional Expressions (1)–(3) below:

$$0.8 < |fb/fa| < 1.7$$

$$0.5 < |D/f2| < 1.2$$

$$1.4 < f1/fb < 2.5$$

wherein,
f1 is the focal length of the first lens group G1,
f2 is the focal length of the second lens group G2,
fa is the focal length of the front lens subgroup Ga,
fb is the focal length of the rear lens subgroup Gb, and
D is the axial distance between the rear principal point of the front lens subgroup Ga and the front principal point of the rear lens subgroup Gb.

Satisfaction of Conditional Expression (1) ensures a sufficient axial distance between the varifocal lens and the photographic paper while helping to maintain superior quality of an image imprinted on the photographic paper by the varifocal lens.

Exceeding the upper limit in Conditional Expression (1) causes the telephoto ratio of the second lens group G2 to become too great, thus making it difficult to ensure a sufficiently long axial distance between the photographic paper and the varifocal lens at the low-magnification end.

Falling below the lower limit in Conditional Expression (1) results in an insufficient axial distance between the first lens group G1 and the second lens group G2, thus making the telephoto ratio of the second lens group G2 too small to provide a desired magnification ratio for the lens system without making the space between the first lens group G1 and the second lens group G2 too great. This, in turn, makes it impossible to ensure a minimum required distance between the film and the varifocal lens at the high-magnification end.

Conditional Expression (2) specifies an optimal range for the distance between the rear principal point of the front lens subgroup Ga and the front principal point of the rear lens subgroup Gb.

Exceeding the upper limit of Conditional Expression (2) causes the overall length of the varifocal lens to become too long. Exceeding the upper limit also causes (a) the positive doublet L6 and the positive lens element L7 to become diametrically too large, and/or (b) the lens element immediately rearward of the aperture S in the front lens subgroup Ga to become too large. Either or both situations makes it impossible for the varifocal lens to be advantageously of a small size and light weight. Furthermore, exceeding the upper limit causes the distance between the rear surface of the negative lens L10 (i.e., the rear-most lens surface in the rear lens subgroup Gb) to become too short.

Falling below the lower limit of Conditional Expression (2) requires that both the focal length fa of the front lens subgroup Ga and the focal length fb of the rear lens subgroup Gb be made too small to ensure the required telephoto ratio in the second lens group G2 while achieving satisfactory aberration correction, thus making it impossible to obtain excellent image quality.

Conditional Expression (3) specifies an optimum range for the ratio between of the focal length f1 of the first lens group G1 and the focal length fb of the rear lens subgroup Gb.

Exceeding the upper limit of Conditional Expression (3) causes the amount of change in the axial distance between the first lens group G1 and the second lens group G2 necessary to achieve a required range of magnification to become too great. This is undesirable because it disadvantageously causes an increase in the overall size of the varifocal lens.

It is advantageous to keep the varifocal lens as small as possible by not falling below the lower limit of Conditional Expression (3). Falling below the lower limit of Conditional Expression (3) can also necessitate making the refractive powers of the various lens groups too strong, thereby making it difficult to achieve satisfactory aberration correction and, thus, excellent image quality.

It will be appreciated that the present invention encompasses not only a varifocal lens, as described generally above, alone but also any of various projection assemblies, such as photographic enlargers incorporating the varifocal lens. Persons of ordinary skill in the art will appreciate that a photographic enlarger incorporating the varifocal lens would typically include, inter alia, (1) an illumination source disposed rearwardly of the lens; (2) a mounting for photographic film operable to dispose an image on the film between the illumination source and the lens so as to allow the lens to project the image onto photographic paper; (3) the varifocal lens; and (4) a mounting for the photographic paper operable to position the paper frontwise relative to the lens. The illumination source, image on the film, varifocal lens, and photographic paper are normally arranged along an optical axis.

EXAMPLE EMBODIMENT 1

Specific lens elements comprising Example Embodiment 1 are shown in FIG. 1. Referring to FIG. 1, the first lens group G1 comprises, in order from frontwise to rearwise, a biconcave lens element L1 and a biconvex lens element L2. The second lens group G2 comprises, in order from frontwise to rearwise, a front lens subgroup Ga and a rear lens subgroup Gb. The front lens subgroup Ga consists of a biconvex lens element L3, a positive cemented lens assembly consisting of a biconvex lens element L4 and a biconcave lens element L5, a positive doublet L6 consisting of a negative meniscus lens element having a convex surface 10 oriented frontwardly and a biconvex lens element, and a positive meniscus lens element L7 having a convex surface 13 oriented frontwardly. The rear lens subgroup Gb consists of a negative meniscus lens element L8 having a concave surface 15 oriented frontwardly, and a positive cemented lens assembly consisting of a biconvex lens element L9 and a negative meniscus lens element L10 having a convex surface 19 oriented rearwardly.

An aperture S is disposed between the biconcave lens element L5 and the doublet L6 in the front subgroup Ga.

Numerical data for Example Embodiment 1 are listed in Table 1, below. In Table 1, $\beta$ is the magnification at the film surface when light rays are traced from the front side.

Data pertaining to refractive index and Abbe's number are relative to the e-line ($\lambda$=546.1 nm). Additionally, d0 is the distance between the photographic paper and the front-most surface (surface 1) of the varifocal lens and Bf is the distance between the rear-most surface (surface 19) of the varifocal lens and the film surface.

TABLE 1

| Focal length (f): | 95.37 to 122.87 mm | | |
|---|---|---|---|
| F number: | 8.0 to 9.4 | | |
| Overall distance: | 556.54 min | | |
| Image diameter: | 69 mm | | |
| Surface | Curvature Radius (mm) | Interfacial Distance (mm) | Abbe's Number | Refractive Index |
| 1 | −178.3555 | 2.3100 | 43.35 | 1.845033 |
| 2 | 38.7485 | 2.1700 | | |
| 3 | 40.6244 | 3.0100 | 32.17 | 1.677648 |
| 4 | −1411.4710 | d4 | | |
| 5 | 55.5926 | 2.6600 | 67.87 | 1.595274 |
| 6 | −243.2109 | 0.1400 | | |
| 7 | 28.8336 | 5.4600 | 65.42 | 1.605201 |
| 8 | −50.0528 | 7.9800 | 49.45 | 1.776511 |
| 9 | 31.8972 | 9.8000 | | |
| 10 | 107.5200 | 2.5900 | 35.19 | 1.754548 |
| 11 | 30.4352 | 4.9000 | 69.98 | 1.520370 |
| 12 | −47.0860 | 1.0500 | | |
| 13 | 24.8572 | 4.2000 | 64.10 | 1.518723 |
| 14 | 27.5167 | 19.2500 | | |
| 15 | −20.7264 | 2.1000 | 64.10 | 1.518723 |
| 16 | −113.6105 | 2.2400 | | |
| 17 | 2758.6812 | 6.3000 | 36.98 | 1.616859 |
| 18 | −29.8412 | 2.1000 | 65.42 | 1.605201 |
| 19 | −224.6821 | Bf | | |

| Variables during magnification change: | | | |
|---|---|---|---|
| Variable | Low Mag. | Med. Mag. | High Mag. |
| β | −0.76923 | −0.50000 | −0.33333 |
| d0 | 339.91002 mm | 378.28035 mm | 400.27264 mm |
| d4 | 0.57917 mm | 5.20468 mm | 14.38414 mm |
| Bf | 137.79281 mm | 94.79699 mm | 63.62523 mm |

| Conditional Values: |
|---|
| f1 = −118.882 mm |
| f2 = 49.496 mm |
| fa = 47.024 mm |
| fb = −59.948 mm |
| D = 44.031 mm |
| (1) lfb/fal = 1.27 |
| (2) lD/f2l = 0.89 |
| (3) f1/fb = 1.98 |

FIGS. 2–4 are the various aberration graphs for Example Embodiment 1, wherein FIG. 2 shows aberration graphs in the low-magnification state ($\beta$=−0.76923), FIG. 3 shows aberration graphs in the medium-magnification state ($\beta$=−0.50000), FIG. 4 shows aberration graphs in the high-magnification state ($\beta$=−0.33333). Graph A in each of FIGS. 2–4 is of spherical aberration, graph B in each of said figures is of astigmatism, graph C in each of said figures is of distortion, graph D in each of said figures is of transverse aberration, and graph E in each of said figures is of lateral chromatic aberration.

In FIGS. 2–4, NA is the aperture number, Y is the image height, E is the e-line (λ=546.1 nm) and G is the g-line (λ=435.8 nm). In FIGS. 2A, 3A, and 4A, dotted lines represent respective sine conditions. In FIGS. 2B, 3B, and 4B, solid lines represent sagittal image surfaces and dotted lines represent meridional image surfaces.

As is clear from FIGS. 2–4, the various aberrations are well corrected in Example Embodiment 1 at all magnification conditions from low magnification to high magnification.

It can also be seen that, in this Example Embodiment 1, the magnification of the varifocal lens at the high-magnification end is 2.3 times the magnification at the low-magnification end. Nevertheless, over the range from the low-magnification end to the high-magnification end, the distance d0 from the varifocal lens to the photographic paper and the distance Bf from the varifocal lens to the film are both appropriate for use in a photographic enlarger. Specifically, the distance d0 from the photographic paper to lens surface 1 is approximately 61% of the overall distance (conjugate distance).

EXAMPLE EMBODIMENT 2

Figure 5:
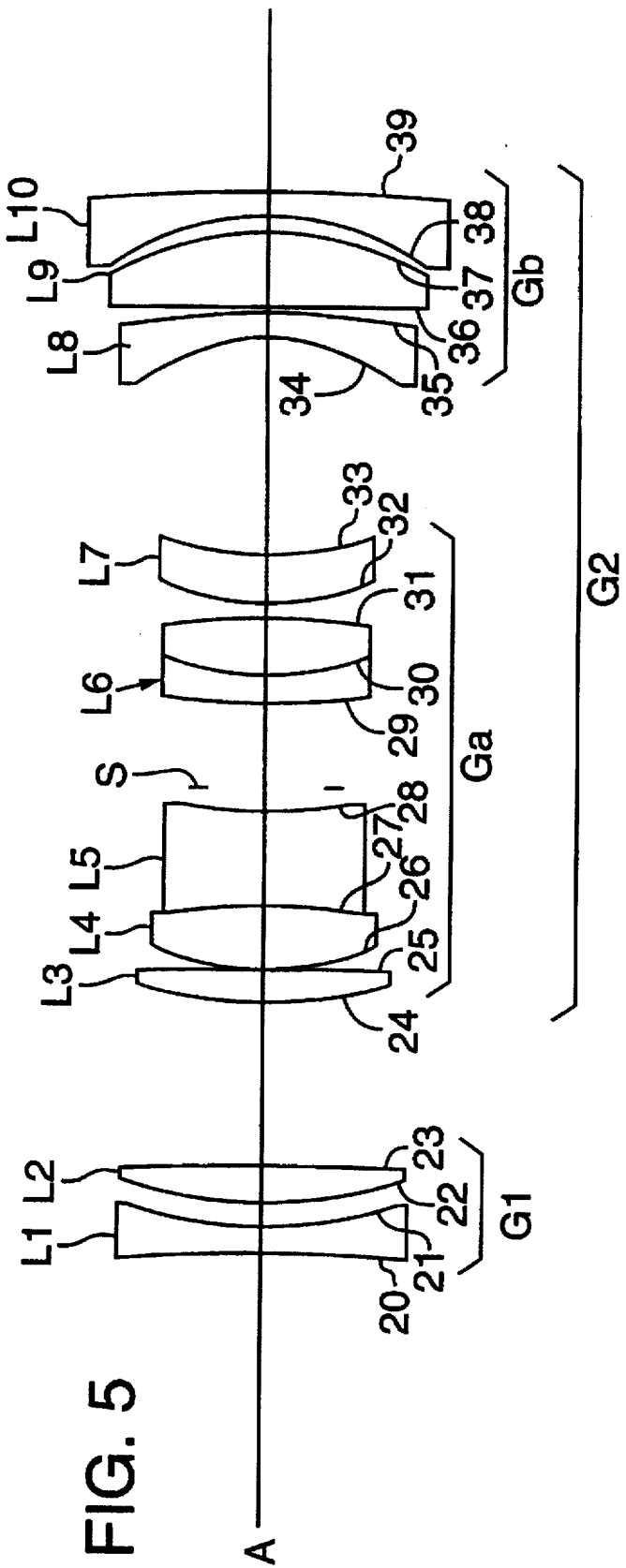
FIG. 5 is an optical diagram of a varifocal lens according to the second Example Embodiment.

The lens elements comprising Example Embodiment 2 are shown in FIG. 5. Referring to FIG. 5, the first lens group G1 comprises, in order from frontwise to rearwise, a biconcave lens element L1 and a biconvex lens element L2. The second lens group G2 comprises, in order from frontwise to rearwise, a front lens subgroup Ga and a rear lens subgroup Gb. The front lens subgroup Ga consists of a biconvex lens element L3, a positive cemented lens assembly consisting of a biconvex lens element L4 and a biconcave lens element L5, a positive doublet L6 consisting of a negative meniscus lens element having a convex surface 29 oriented frontwardly and a biconvex lens element, and a positive meniscus lens element L7 having a convex surface 32 oriented frontwardly. The rear lens subgroup Gb consists of a negative meniscus lens element L8 having a concave surface 34 oriented frontwardly, a biconvex lens element L9 and a negative meniscus lens element L10 having a convex surface 39 oriented rearwardly.

An aperture S is disposed between the biconcave lens element L5 and the doublet L6 in the front subgroup Ga.

Numerical data for Example Embodiment 2 are listed in Table 2, below. In Table 2, β is the magnification at the film surface when light rays are traced from the front side.

Data pertaining to refractive index and Abbe's number are relative to the e-line (λ=546.1 nm). Additionally, d0 is the distance between the photographic paper and the front-most surface (surface 20) of the varifocal lens and Bf is the distance between the rear-most surface (surface 39), of the varifocal lens and the film surface.

TABLE 2

| | Focal length (f): | 94.24 to 120.93 mm | | |
|---|---|---|---|---|
| | F number: | 7.9 to 9.3 | | |
| | Overall distance: | 556.54 mm | | |
| | Image diameter: | 69 mm | | |
| Surface No. | Curvature Radius (mm) | Interfacial Distance (mm) | Abbe's Number | Refractive Index |
| 20 | −178.3555 | 2.3100 | 43.35 | 1.845033 |
| 21 | 38.7485 | 2.1700 | | |
| 22 | 40.6244 | 3.0100 | 32.17 | 1.677648 |
| 23 | −1411.4710 | d23 | | |
| 24 | 55.1965 | 2.6600 | 67.87 | 1.595274 |
| 25 | −240.3532 | 0.1400 | | |
| 26 | 28.7389 | 5.4600 | 65.42 | 1.605201 |
| 27 | −49.5750 | 7.9800 | 49.45 | 1.776511 |
| 28 | 31.9368 | 9.8000 | | |
| 29 | 106.9340 | 2.5900 | 35.19 | 1.754548 |
| 30 | 29.1736 | 4.9000 | 69.98 | 1.520370 |
| 31 | −46.8480 | 1.0500 | | |
| 32 | 24.8144 | 4.2000 | 64.10 | 1.518723 |
| 33 | 27.8494 | 19.2500 | | |
| 34 | −21.0349 | 2.1000 | 64.14 | 1.518723 |
| 35 | −80.3846 | 0.7000 | | |
| 36 | −3851.8283 | 6.3000 | 36.27 | 1.616859 |
| 37 | −26.4626 | 1.4000 | | |
| 38 | −26.2264 | 2.1000 | 65.42 | 1.605201 |
| 39 | −224.6834 | Bf | | |

| Variables during magnification change: | | | |
|---|---|---|---|
| Variable | Low Mag. | Med. Mag. | High Mag. |
| β | −0.76923 | −0.50000 | −0.33333 |
| d0 | 339.70964 mm | 377.26401 mm | 398.74894 mm |
| d23 | 0.79643 mm | 5.24765 mm | 14.07497 mm |
| Bf | 133.96043 mm | 91.95484 mm | 61.64259 mm |

| Conditional Values: |
|---|
| f1 = −118.883 mm |
| f2 = 47.700 mm |
| fa = 46.737 mm |
| fb = −55.158 mm |
| D = 45.624 mm |
| (1) lfb/fal = 1.18 |
| (2) lD/f2l = 0.96 |
| (3) f1/fb = 2.16 |

FIGS. 6–8 are the various aberration graphs for Example Embodiment 2, wherein FIG. 6 shows aberration graphs in the low-magnification state (β=−0.76923), FIG. 7 shows aberration graphs in the medium-magnification state (β=−0.50000), and FIG. 8 shows aberration graphs in the high-magnification state (β=−0.33333). Graph A in each of FIGS. 6–8 is of spherical aberration, graph B in each of said figures is of astigmatism, graph C in each of said figures is of distortion, graph D in each of said figures is of transverse aberration, and graph E in each of said figures is of lateral chromatic aberration.

In FIGS. 6–8, NA is the aperture number, Y is the image height, E is the e-line (λ=546.1 nm) and G is the g-line (λ=435.8 nm). In FIGS. 6A, 7A, and 8A, dotted lines represent respective sine conditions. In FIGS. 6B, 7B, and 8B, solid lines represent sagittal image surfaces and dotted lines represent meridional image surfaces.

As is clear from FIGS. 6–8, the various aberrations are well corrected in Example Embodiment 2 at all magnification conditions from low magnification to high magnification.

It can also be seen that, in this Example Embodiment 2, the magnification of the varifocal lens at the high-magnification end is 2.3 times the magnification at the low-magnification end. Nevertheless, over the range from the low-magnification end to the high-magnification end, the distance d0 from the varifocal lens to the photographic paper and the distance Bf from the varifocal lens to the film are both appropriate for use in a photographic enlarger. Specifically, the distance d0 from the photographic paper to lens surface 20 is approximately 61% of the overall distance (conjugate distance).

EXAMPLE EMBODIMENT 3

Figure 9:
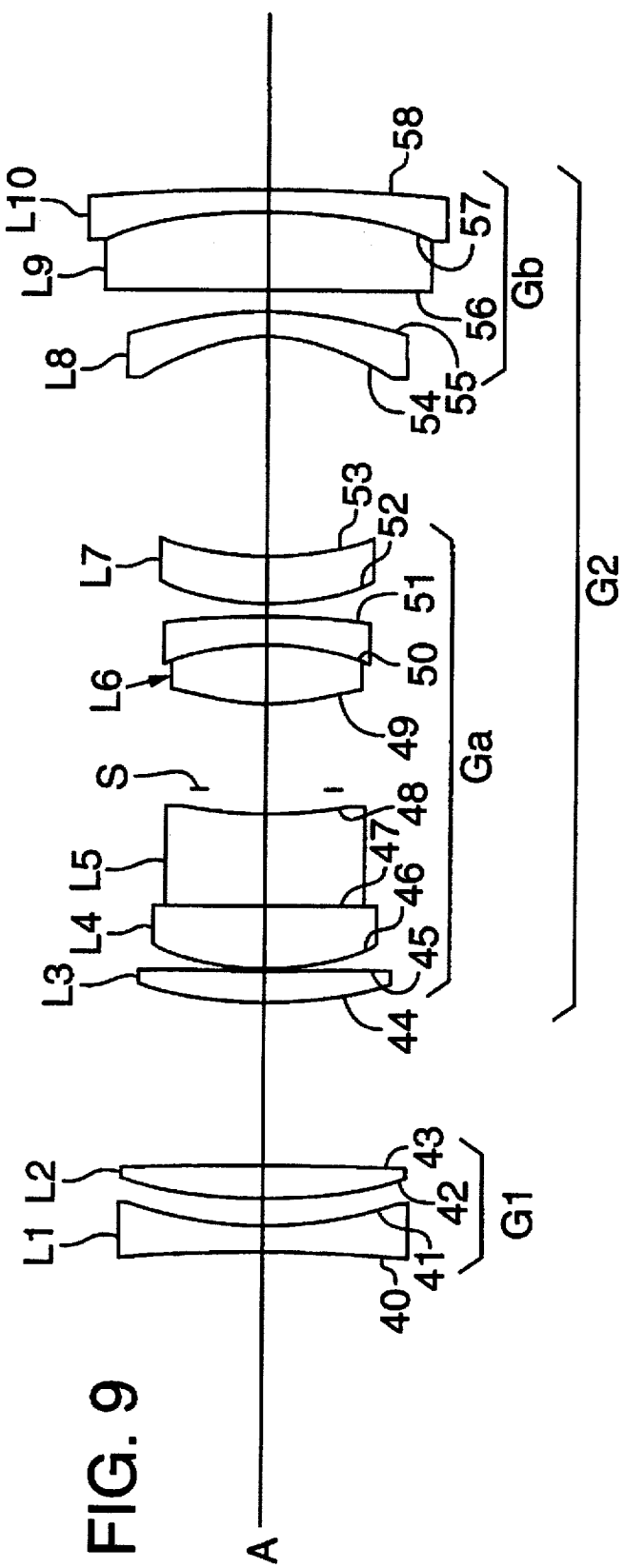
FIG. 9 is an optical diagram of a varifocal lens according to the third Example Embodiment.

The lens elements comprising Example Embodiment 3 are shown in FIG. 9. Referring to FIG. 9, the first lens group G1 comprises, in order from frontwise to rearwise, a biconcave lens element L1 and a biconvex lens element L2. The second lens group G2 comprises, in order from frontwise to rearwise, a front lens subgroup Ga and a rear lens subgroup Gb. The front lens subgroup Ga consists of a positive meniscus lens element L3 having a convex surface 44 oriented frontwardly, a positive cemented lens assembly consisting of a biconvex lens element L4 and a biconcave lens element L5, a positive doublet L6 consisting of a biconvex lens element and a negative meniscus lens element having a concave surface 50 oriented frontwardly, and a positive meniscus lens element L7 having a convex surface 52 oriented frontwardly. The rear lens subgroup Gb consists of a negative meniscus lens element L8 having a concave surface 54 oriented frontwardly, a positive meniscus lens element L9 having a concave surface 56 oriented frontwardly, and a negative meniscus lens element L10 having a convex surface 58 oriented rearwardly.

An aperture S is disposed between the biconcave lens element L5 and the doublet L6 in the front subgroup Ga.

Numerical data for Example Embodiment 3 are listed in Table 3, below. In Table 3, β is the magnification at the film surface when light rays are traced from the front side.

Data pertaining to refractive index and Abbe's number are relative to the e-line (λ=546.1 nm). Additionally, d0 is the distance between the photographic paper and the front-most surface (surface 40) of the varifocal lens and Bf is the distance between the rear-most surface (surface 58) of the varifocal lens and the film surface.

TABLE 3

| Surface No. | Curvature Radius (mm) | Interfacial Distance (mm) | Abbe's Number | Refractive Index |
|---|---|---|---|---|
| | Focal length (f): | 96.96–123.38 mm | | |
| | F number: | 8.0–9.4 | | |
| | Overall distance: | 556.55 mm | | |
| | Image diameter: | 69 mm | | |
| 40 | −178.3555 | 2.3100 | 43.35 | 1.845033 |
| 41 | 38.7485 | 2.1700 | | |
| 42 | 40.6244 | 3.0100 | 32.17 | 1.677648 |
| 43 | −1411.4710 | d43 | | |
| 44 | 50.8259 | 2.6600 | 67.87 | 1.595274 |
| 45 | 522.9922 | 0.1400 | | |
| 46 | 26.2875 | 5.4600 | 65.42 | 1.605201 |
| 47 | −267.6564 | 7.9800 | 49.45 | 1.776511 |
| 48 | 27.4925 | 9.8000 | | |
| 49 | 35.8992 | 2.5900 | 69.98 | 1.520370 |
| 50 | −23.0833 | 4.9000 | 35.19 | 1.754548 |
| 51 | −80.1635 | 1.0500 | | |
| 52 | 27.3770 | 4.2000 | 64.10 | 1.518723 |
| 53 | 24.1454 | 19.2500 | | |
| 54 | −18.5218 | 2.1000 | 61.09 | 1.591430 |
| 55 | −39.8507 | 2.2400 | | |
| 56 | −251.4136 | 6.3000 | 27.61 | 1.761660 |
| 57 | −49.2703 | 2.1000 | 67.87 | 1.595274 |
| 58 | −244.6824 | Bf | | |

Variables during magnification change:

| Variable | Low Mag. | Med. Mag. | High Mag. |
|---|---|---|---|
| β | −0.76923 | −0.50000 | −0.33333 |
| d0 | 343.69722 mm | 381.44790 mm | 403.06766 mm |
| d4 | 0.79924 mm | 5.27091 mm | 14.13690 mm |
| Bf | 133.79470 mm | 94.90283 mm | 65.18426 mm |

Conditional Values:

f1 = −118.883 mm
f2 = 50.795 mm
fa = 47.947 mm
fb = −76.898 mm

TABLE 3-continued

| D = | 43.636 mm |
|---|---|
| (1) |fb/fa| = | 1.60 |
| (2) |D/f2| = | 0.86 |
| (3) f1/fb = | 1.55 |

Figures 11D, 11E:
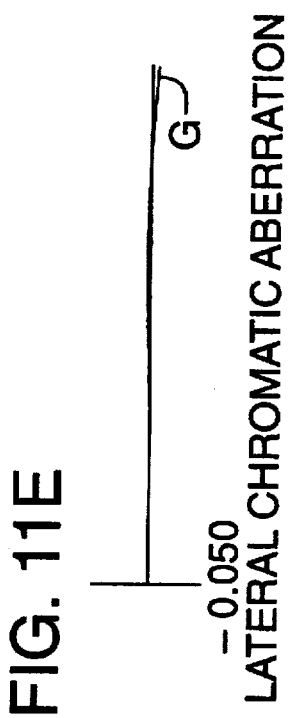
FIG. 11D shows transverse aberration.
FIG. 11E shows lateral chromatic aberration.

FIGS. 10–12 are the various aberration graphs for Example Embodiment 3, wherein FIG. 10 shows aberration graphs in the low-magnification state (β=−0.76923), FIG. 11 shows aberration graphs in the medium-magnification state (β=−0.50000), and FIG. 12 shows aberration graphs in the high-magnification state (β=−0.33333). Graph A in each of FIGS. 10–12 is of spherical aberration, graph B in each of said figures is of astigmatism, graph C in each of said figures is of distortion, graph D in each of said figures is of transverse aberration, and graph E in each of said figures is of lateral chromatic aberration.

In FIGS. 10–12, NA is the aperture number, Y is the image height, E is the e-line (λ=546.1 nm) and G is the g-line (λ=435.8 nm). In FIGS. 10A, 11A, and 12A, dotted lines represent respective sine conditions. In FIGS. 10B, 11B, and 12B, solid lines represent sagittal image surfaces and dotted lines represent meridional image surfaces.

As is clear from FIGS. 10–12, the various aberrations are well corrected in Example Embodiment 3 at all magnification conditions from low magnification to high magnification.

It can also be seen that, in this Example Embodiment 3, the magnification of the varifocal lens at the high-magnification end is 2.3 times the magnification at the low-magnification end. Nevertheless, over the range from the low-magnification end to the high-magnification end, the distance d0 from the varifocal lens to the photographic paper and the distance Bf from the varifocal lens to the film are both appropriate for use in a photographic enlarger. Specifically, the distance d0 from the photographic paper to lens surface 40 is approximately 62% of the overall distance (conjugate distance).

Whenever the configuration of any of the foregoing Example Embodiments is used, e.g., in a photographic enlarger, it is possible to achieve excellent image quality while maintaining a sufficient axial distance between the varifocal lens and the film, and between the varifocal lens and the photographic paper, no matter whether the varifocal lens is used at low magnification or at high magnification. Any illumination irregularities can be decreased by means of the 100% off-axis vignetting factor in a varifocal lens according to the present invention.

The aforementioned embodiments are intended, at most, to clarify the technical content of this invention. It is to be understood that this invention can be variously modified within the intent and scope of this invention as set forth in the claims, without being narrowly interpreted so as to be limited to the aforementioned embodiments.

What is claimed is:

1. A varifocal lens comprising, in order from front to rear on an optical axis:

(a) a first lens group having a negative focal length f1;

(b) a second lens group having a positive focal length f2 and being axially spaced a distance from the first lens group;

(c) the varifocal lens being operable to change its overall focal length by changing the distance between the first and second lens groups;

(d) the first lens group comprising, in order from front to rear, a biconcave lens element and a positive lens element, and the second lens group comprising a front subgroup having a focal length fa, and a rear subgroup having a focal length fb;

(e) the front subgroup comprising, in order from front to rear, a first positive lens element, a first cemented lens, a second cemented lens having positive refractive power, and a second positive lens element;

(f) the rear subgroup comprising, in order from front to rear, a negative lens element, a positive lens element, and a negative meniscus lens element having a convex surface oriented rearwardly;

(g) the varifocal lens fulfilling the conditions:

$$0.8 < |fb/fa| < 1.7$$

$$0.5 < |D/f2| < 1.2$$

$$1.4 < |f1/fb| < 2.5$$

wherein D is the distance between the rear principal point of the front subgroup and the front principal point of the rear subgroup.

2. The varifocal lens of claim 1, wherein the first cemented lens in the front subgroup consists of, in order from front to rear, a positive lens element and a negative lens element.

3. The varifocal lens of claim 1, wherein the second cemented lens in the front subgroup consists of, in order from front to rear, a negative lens element and a positive lens element.

4. The varifocal lens of claim 1, wherein the positive lens element and the negative meniscus lens element in the rear subgroup are cemented together.

5. The varifocal lens of claim 1, wherein the positive lens element and the negative meniscus lens element in the rear subgroup are separated from each other.

6. The varifocal lens of claim 1, further comprising an aperture disposed between the cemented lens in the front subgroup and the positive cemented meniscus lens element in the front subgroup.

7. A photographic enlarger comprising the varifocal lens of claim 1.

8. A varifocal lens comprising, in order from front to rear on an optical axis:

(a) a first lens group having a negative focal length f1;

(b) a second lens group having a positive focal length f2 and being spaced a distance from the first lens group;

(c) the varifocal lens being operable to change its overall focal length by changing the distance between the first and second lens groups;

(d) the second lens group comprising a front subgroup having a positive focal length fa and a rear subgroup having a negative focal length fb;

(e) the rear subgroup comprising a negative lens element, a positive lens element, and a negative meniscus lens element having a convex surface oriented rearwardly;

(f) the varifocal lens fulfilling the conditions:

$$0.8 < |fb/fa| < 1.7$$

$$0.5 < |D/f2| < 1.2$$

$$1.4 < |f1/fb| < 2.5$$

wherein D is a distance between the rear principal point of the front subgroup and the front principal point of the rear subgroup.

9. The varifocal lens of claim 8, wherein the first lens group comprises, in order from front to rear, a negative lens element and a positive lens element.

10. The varifocal lens of claim 8, wherein the front subgroup comprises, as the rearmost lens element in said subgroup, a positive meniscus lens element having a convex surface oriented frontwardly.

11. The varifocal lens of claim 8, further comprising an aperture disposed in the front subgroup.

12. A photographic enlarger comprising the varifocal lens of claim 8.

13. A varifocal lens comprising, in order from front to rear:

(a) a first lens group having a negative focal length f1;

(b) a second lens group having a positive focal length f2 and being axially spaced a distance from the first lens group;

(c) the varifocal lens being operable to change its overall focal length by changing the distance between the first and second lens groups;

(d) the second lens group comprising a front subgroup having a positive focal length fa and a rear subgroup having a negative focal length fb;

(e) the varifocal lens fulfilling the conditions:

$$0.8 < |fb/fa| < 1.7$$

$$0.5 < |D/f2| < 1.2$$

$$1.4 < |f1/fb| < 2.5$$

wherein D is a distance between the rear principal point of the front subgroup and the front principal point of the rear subgroup.

14. The varifocal lens of claim 13, wherein the front subgroup comprises a positive meniscus lens element having a convex surface oriented frontwardly and being the rearmost lens element in the front subgroup.

15. The varifocal lens of claim 13, wherein the rear subgroup comprises, in order from front to rear, a negative lens element, a positive lens element, and a negative meniscus lens element having a convex surface oriented rearwardly.

16. A photographic enlarger comprising the varifocal lens of claim 13.

17. The varifocal lens of claim 13, further conforming to:

| | Focal length (f): | 95.37 to 122.87 mm | | |
| | F number: | 8.0 to 9.4 | | |
| | Overall distance: | 556.54 mm | | |
| | Image diameter: | 69 mm | | |
| Surface | Curvature Radius (mm) | Interfacial Distance (mm) | Abbe's Number | Refractive Index |
| --- | --- | --- | --- | --- |
| 1 | −178.3555 | 2.3100 | 43.35 | 1.845033 |
| 2 | 38.7485 | 2.1700 | | |
| 3 | 40.6244 | 3.0100 | 32.17 | 1.677648 |
| 4 | −1411.4710 | d4 | | |
| 5 | 55.5926 | 2.6600 | 67.87 | 1.595274 |
| 6 | −243.2109 | 0.1400 | | |
| 7 | 28.8336 | 5.4600 | 65.42 | 1.605201 |
| 8 | −50.0528 | 7.9800 | 49.45 | 1.776511 |
| 9 | 31.8972 | 9.8000 | | |
| 10 | 107.5200 | 2.5900 | 35.19 | 1.754548 |
| 11 | 30.4352 | 4.9000 | 69.98 | 1.520370 |
| 12 | −47.0860 | 1.0500 | | |
| 13 | 24.8572 | 4.2000 | 64.10 | 1.518723 |
| 14 | 27.5167 | 19.2500 | | |
| 15 | −20.7264 | 2.1000 | 64.10 | 1.518723 |

-continued

| | | | | |
|---|---|---|---|---|
| 16 | −113.6105 | 2.2400 | | |
| 17 | 2758.6812 | 6.3000 | 36.98 | 1.616859 |
| 18 | −29.8412 | 2.1000 | 65.42 | 1.605201 |
| 19 | −224.6821 | Bf | | |

Variables during magnification change:

| Variable | Low Mag. | Med. Mag. | High Mag. |
|---|---|---|---|
| β | −0.76923 | −0.50000 | −0.33333 |
| d0 | 339.91002 mm | 378.28035 mm | 400.27264 mm |
| d4 | 0.57917 mm | 5.20468 mm | 14.38414 mm |
| Bf | 137.79281 mm | 94.79699 mm | 63.62523 mm |

Conditional Values:

f1 = −118.882 mm
f2 = 49.496 mm
fa = 47.024 mm
fb = −59.948 mm
D = 44.031 mm
(1) |fb/fa| = 1.27
(2) |D/f2| = 0.89
(3) f1/fb = 1.98

18. The varifocal lens of claim 13, further conforming to:

Focal length (f): 94.24 to 120.93 mm
F number: 7.9 to 9.3
Overall distance: 556.54 mm
Image diameter: 69 mm

| Surface No. | Curvature Radius (mm) | Interfacial Distance (mm) | Abbe's Number | Refractive Index |
|---|---|---|---|---|
| 20 | −178.3555 | 2.3100 | 43.35 | 1.845033 |
| 21 | 38.7485 | 2.1700 | | |
| 22 | 40.6244 | 3.0100 | 32.17 | 1.677648 |
| 23 | −1411.4710 | d23 | | |
| 24 | 55.1965 | 2.6600 | 67.87 | 1.595274 |
| 25 | −240.3532 | 0.1400 | | |
| 26 | 28.7389 | 5.4600 | 65.42 | 1.605201 |
| 27 | −49.5750 | 7.9800 | 49.45 | 1.776511 |
| 28 | 31.9368 | 9.8000 | | |
| 29 | 106.9340 | 2.5900 | 35.19 | 1.754548 |
| 30 | 29.1736 | 4.9000 | 69.98 | 1.520370 |
| 31 | −46.8480 | 1.0500 | | |
| 32 | 24.8144 | 4.2000 | 64.10 | 1.518723 |
| 33 | 27.8494 | 19.2500 | | |
| 34 | −21.0349 | 2.1000 | 64.14 | 1.518723 |
| 35 | −80.3846 | 0.7000 | | |
| 36 | −3851.8283 | 6.3000 | 36.27 | 1.616859 |
| 37 | −26.4626 | 1.4000 | | |
| 38 | −26.2264 | 2.1000 | 65.42 | 1.605201 |
| 39 | −224.6834 | Bf | | |

Variables during magnification change:

| Variable | Low Mag. | Med. Mag. | High Mag. |
|---|---|---|---|
| β | −0.76923 | −0.50000 | −0.33333 |
| d0 | 339.70964 mm | 377.26401 mm | 398.74894 mm |
| d23 | 0.79643 mm | 5.24765 mm | 14.07497 mm |
| Bf | 133.96043 mm | 91.95484 mm | 61.64259 mm |

Conditional Values:

f1 = −118.883 mm
f2 = 47.700 mm
fa = 46.737 mm
fb = −55.158 mm
D = 45.624 mm
(1) |fb/fa| = 1.18
(2) |D/f2| = 0.96
(3) f1/fb = 2.16

19. The varifocal lens of claim 13, further conforming to:

Focal length (f): 96.96–123.38 mm
F number: 8.0–9.4
Overall distance: 556.55 mm
Image diameter: 69 mm

| Surface No. | Curvature Radius (mm) | Interfacial Distance (mm) | Abbe's Number | Refractive Index |
|---|---|---|---|---|
| 40 | −178.3555 | 2.3100 | 43.35 | 1.845033 |
| 41 | 38.7485 | 2.1700 | | |
| 42 | 40.6244 | 3.0100 | 32.17 | 1.677648 |
| 43 | −1411.4710 | d43 | | |
| 44 | 50.8259 | 2.6600 | 67.87 | 1.595274 |
| 45 | 522.9922 | 0.1400 | | |
| 46 | 26.2875 | 5.4600 | 65.42 | 1.605201 |
| 47 | −267.6564 | 7.9800 | 49.45 | 1.776511 |
| 48 | 27.4925 | 9.8000 | | |
| 49 | 35.8992 | 2.5900 | 69.98 | 1.520370 |
| 50 | −23.0833 | 4.9000 | 35.19 | 1.754548 |
| 51 | −80.1635 | 1.0500 | | |
| 52 | 27.3770 | 4.2000 | 64.10 | 1.518723 |
| 53 | 24.1454 | 19.2500 | | |
| 54 | −18.5218 | 2.1000 | 61.09 | 1.591430 |
| 55 | −39.8507 | 2.2400 | | |
| 56 | −251.4136 | 6.3000 | 27.61 | 1.761660 |
| 57 | −49.2703 | 2.1000 | 67.87 | 1.595274 |
| 58 | −244.6824 | Bf | | |

Variables during magnification change:

| Variable | Low Mag. | Med. Mag. | High Mag. |
|---|---|---|---|
| β | −0.76923 | −0.50000 | −0.33333 |
| d0 | 343.69722 mm | 381.44790 mm | 403.06766 mm |
| d4 | 0.79924 mm | 5.27091 mm | 14.13690 mm |
| Bf | 133.79470 mm | 94.90283 mm | 65.18426 mm |

Conditional Values:

f1 = −118.883 mm
f2 = 50.795 mm
fa = 47.947 mm
fb = −76.898 mm
D = 43.636 mm
(1) |fb/fa| = 1.60
(2) |D/f2| = 0.86
(3) f1/fb = 1.55

\* \* \* \* \*

UNITED STATES PATENT AND TRADEMARK OFFICE
CERTIFICATE OF CORRECTION

PATENT NO. : 5,696,633
DATED : December 9, 1997
INVENTOR(S) : Masaya Nakajima

It is certified that error appears in the above-identified patent and that said Letters Patent is hereby corrected as shown below:

Column 4, line 4, "LB" should be --L8--.

Column 6, line 21, in the fourth line of Table 1, "min" should be --mm--.

Column 7, line 52, delete the period (".") after --(surface 39)--.

Column 9, line 5, "Cb" should be --Gb--.

Signed and Sealed this

Eighth Day of September, 1998

Attest:

BRUCE LEHMAN

Attesting Officer     Commissioner of Patents and Trademarks